United States Patent Office 3,704,260
Patented Nov. 28, 1972

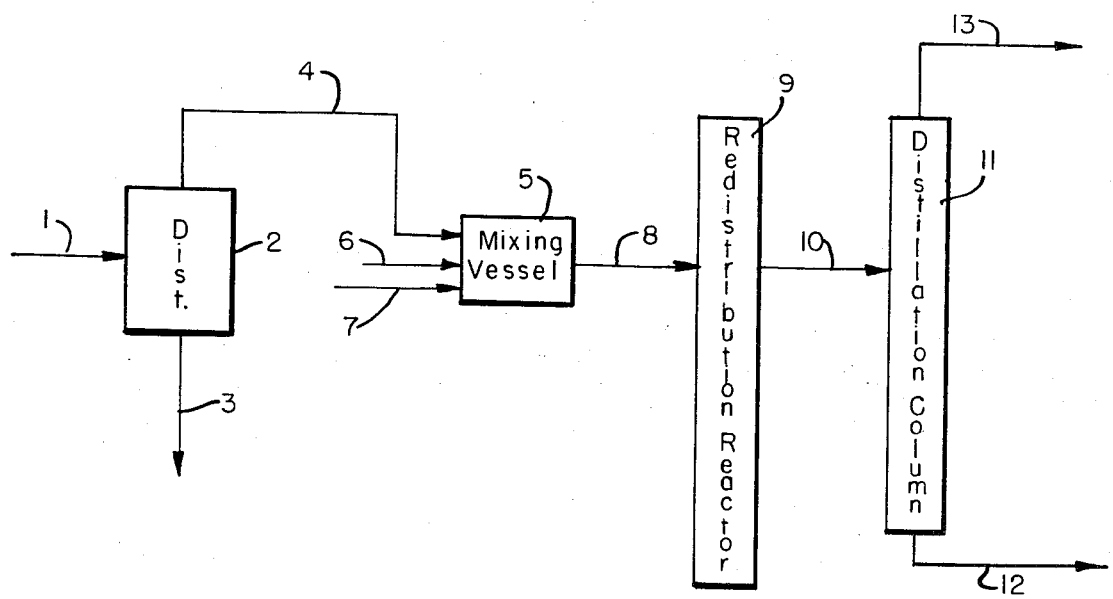

3,704,260
PURIFICATION OF DIMETHYLHYDROGEN-
CHLOROSILANE
Michael J. Wynn, Rexford, N.Y., assignor to
General Electric Company
Filed Aug. 27, 1971, Ser. No. 175,489
Int. Cl. C07f 7/20
U.S. Cl. 260—448.2 E                                    12 Claims

ABSTRACT OF THE DISCLOSURE

Process for purifying dimethylhydrogenchlorosilane contaminated with 2-methylbutene-2 which comprises subjecting the impure dimethylhydrogenchlorosilane to a redistribution reaction and then subjecting it to distillation.

BACKGROUND OF THE INVENTION

The present invention is concerned with obtaining purified dimethylhydrogenchlorosilane. More particularly, the present invention is concerned with purifying dimethylhydrogenchlorosilane which is contaminated with 2-methylbutene-2.

One of the most troublesome problems encountered in the preparation of silicone polymers is attaching organic groups to a silicon atom by carbon-silicon bonds. The organic groups are generally attached to silicon atoms at the monomer stage, and the monomers are mostly organochlorosilane. One such chlorosilane monomer of considerable interest is dimethylhydrogenchlorosilane. Dimethylhydrogenchlorosilane is a by-product formed during the direct process for preparing dimethyldichlorosilane by reacting methyl chloride and copper-silicon.

Dimethylhydrogenchlorosilane has been obtained from crude organochlorosilane mixtures by purification processes involving distillation. However, the dimethylhydrogenchlorosilane obtained from mere distillation is contaminated with large quantities of 2-methylbutene-2, which is another by-product of the direct process for preparing dimethyldichlorosilane. This impure dimethylhydrogenchlorosilane must therefore be subjected to further purification operations to be of suitable purity for subsequent use in the preparation of silicone polymers. The 2-methylbutene-2 is an extremely difficult material to separate from dimethylhydrogenchlorosilane. Since its boiling point is extremely close to the boiling point of dimethylhydrogenchlorosilane, distillation is virtually eliminated as a suitable purification method.

Dimethylhydrogenchlorosilane boils at 35° C., and 2-methylbutene-2 boils at 38.4° C. Accordingly, heretofore the 2-methylbutene-2 contaminant in the dimethylhydrogenchlorosilane has been hydrochlorinated and then the hydrochlorinated material has been subsequently separated from the dimethylhydrogenchlorosilane by distillation. It is therefore quite apparent that heretofore it has been necessary to expand considerable time and expense to obtain dimethylhydrogenchlorosilane of sufficient purity to be of significant commercial value.

The process of the present invention provides an efficient, relatively fast, and relatively inexpensive means for obtaining purified dimethylhydrogenchlorosilane substantially free from 2-methylbutene-2 without the need of employing an expensive and time consuming hydrochlorination operation. In addition, the process of the present invention provides for a simultaneous increase in the quantity of obtainable dimethylhydrogenchlorosilane along with conversion of the 2-methylbutene-2 to a material which can readily and easily be separated from dimethylhydrogenchlorosilane.

Another advantage of the present invention is the production of dimethyldichlorosilane which is a very valuable silicone polymer precursor.

BRIEF DESCRIPTION OF INVENTION

The present invention is concerned with a process for purifying an impure dimethylhydrogenchlorosilane admixture which comprises:
(a) providing an admixture containing dimethylhydrogenchlorosilane, and 2-methylbutene-2;
(b) introducing said admixture into a redistribution zone;
(c) subjecting said admixture to redistribution in said redistribution zone;
(d) transferring the admixture from said redistribution zone to a distillation zone;
(e) subjecting the admixture to distillation in said distillation zone; and
(f) recovering purified dimethylhydrogenchlorosilane.

The figure illustrates a preferred method for recovering purified dimethylhydrogenchlorosilane from an impure admixture thereof.

DESCRIPTION OF PREFERRED EMBODIMENTS

The dimethylhydrogenchlorosilane admixture which is to be subjected to the purification process of the present invention is contaminated with 2-methylbutene-2, and contains other silanes which have boiling points up to about 41° C., and usually within the range of about 26.5 to about 41° C. The crude dimethylhydrogenchlorosilane admixture may also initially contain silanes boiling above about 41° C. since it may be obtained initially from a direct process for preparing organochlorosilanes and particularly from a reaction between methyl chloride and copper-silicon wherein the major product is dimethyldichlorosilane. Other silanes which may initially be present with the dimethylhydrogenchlorosilane include methyltrichlorosilane, tetramethylsilane, methylhydrogendichlorosilane, trichlorohydrogensilane, tetrachlorosilane, disilanes such as $(CH_3)Cl_2Si-SiCl_2(CH_3)$, and silmethylenes such as $Cl_3SiCH_2SiCl_3$. In addition the impure dimethylhydrogenchlorosilane admixture may contain hydrocarbons such as pentenes other than 2-methylbutene-2 and pentanes. Of course, the impure dimethylhydrogenchlorosilane admixture can be obtained from sources other than from a direct process for preparing dimethyldichlorosilane.

It is generally preferred that this impure dimethylhydrogenchlorosilane admixture obtained as one of the by-products from a direct process of reacting methyl chloride and copper-silicon initially be subjected to a distillation in order to remove the higher boiling silanes from the dimethylhydrogenchlorosilane admixture. The silanes removed in this distillation generally have boiling points of at least about 41° C. This distillation is generally carried out at a temperature from about 38° C. to about 42° C. and a pressure of about 15 p.s.i.g. After this distillation, the dimethylhydrogenchlorosilane admixtures which are of particular interest contain from about 10 to about 30% by weight of dimethylhydrogenchlorosilane, from about 15 to about 35% by weight of tetramethylsilane, from about 10 to 30% by weight of trichlorohydrogensilane, from 0 to about 20% by weight of methylhydrogendichlorosilane, and from about 15 to about 35% by weight of 2-methylbutene-2.

Moreover it is preferred that the dimethylhydrogenchlorosilane admixture which is obtained from the abovementioned distillation, is admixed with varying quantities of methylhydrogendichlorosilane and trimethylmonochlorosilane.

The impure dimethylhydrogenchlorosilane admixture, which may or may not have been subject to the abovediscussed distillation step and/or the above-discussed mixing procedure, is introduced into a redistribution zone, wherein it is subjected to a redistribution reaction. A redistribution reaction is one of the characteristic types of reactions which organosilicone compounds are capable of undergoing. A redistribution reaction involves the shifting of atoms and/or radicals from one silicon atom to another. In particular the redistribution reaction involved in the process of this invention is concerned with the interchange of organic groups or hydrogen with halogen on a silicon atom. In particular, the redistribution reaction involved is directed to the formation of dimethylhydrogenchlorosilane and dimethyldichlorosilane from the various chlorosilanes present in the admixture. The addition of trimethylchlorosilane and/or methylhydrogendichlorosilane, as mentioned above, facilitates the formation of dimethylhydrogenchlorosilane and dimethyldichlorosilane in that these materials react with other organochlorosilanes present in the admixture. Also the addition of these materials is advantageous since it reduces the concentration of the trichlorohydrogensilane in the admixture which aids in avoiding the formation of explosive gaseous mixtures in the redistribution reactor. These added silane materials are usually in great abundance since they are two of the major by-products in the formation of dimethyldichlorosilane and the demand for these materials is much less than the amounts formed as by-products. Therefore their use herein is preferred since not only does it aid in increasing the amount of dimethylhydrogenchlorosilane and dimethyldichlorosilane in the product but it also obviates a problem of storage or disposal of the methylhydrogendichlorosilane and trimethylchlorosilane. Dimethylhydrogenchlorosilane admixtures which are of particular interest and may be obtained by the addition of the methylhydrogendichlorosilane and trimethylchlorosilane contain from about 1 to about 10% and usually about 1 to about 4% by weight of dimethylhydrogenchlorosilane, about 7 to 10% by weight of tetramethylsilane, less than about 6% by weight of trichlorohydrogensilane, about 25 to about 30% of methylhydrogendichlorosilane, about 40 to about 50% by weight of trimethylchlorosilane, and about 6 to about 10% by weight of 2-methylbutene-2.

The redistribution reaction employed in the process of the present invention is preferably carried out at a temperature of about 110° to about 140° C. and most preferably from about 120° to about 125° C. The redistribution reaction is generally conducted under autogeneous pressure and is usually about 120 p.s.i.g. Of course, higher or lower pressures can be employed, if desired.

In addition, the redistribution reaction is carried out in the presence of a conventional redistribution catalyst, with the preferred catalyst being $AlCl_3$. The amount of catalyst employed is usually from about 3–15% by weight and preferably from about 5–10% by weight of the dimethylhydrogenchlorosilane admixture.

The redistribution reaction is generally conducted for about ¼ hour to about 8 hours and preferably is carried out for about ½ hour to about 5 hours. It is, of course, understood that the time of reaction is inversely related to the temperature of the reaction. The redistribution reaction is conducted in a jacketed vessel containing a suitable stirrer to insure contact between the redistribution catalyst and the dimethylhydrogenchlorosilane admixture. The heat necessary for the reaction can therefore be indirectly supplied to the reaction medium by passing steam through the jackets of the reaction vessel. After the redistribution reaction has proceeded for the desired amount of time, it is substantially terminated by lowering the temperature in the reaction vessel to about 40 to about 60° C. by stopping the flow of steam through the jackets of the reaction vessel. If desired, the reaction medium can be quickly cooled by passing a cool fluid such as water through the jackets of the reaction vessel. As the temperature is reduced, the pressure within the reaction vessel is likewise reduced to about 20 p.s.i.g. The reactants can then be removed from the redistribution reactor by increasing the heat of the reactor to about 110–140° C. to volatilize the reactants. At the same time, a suitable outlet line from the reactor is opened so that the volatilized materials will leave the reactor through it and can then be conducted to subsequent processing operations.

It may be advantageous to conduct the gaseous product from the redistribution reactor to a conventional scrubber in order to reduce the quantity of solid catalyst which may be carried out of the redistribution reactor by the gaseous stream. The scrubber may be any conventional type of apparatus employed to separate solids from vapors and can be a packed column with an overhead condenser.

It has surprisingly been found that during the redistribution reaction, the 2-methylbutene-2 is also converted to a material which boils significanly higher than the dimethylhydrogenchlorosilane.

The specific product which is produced from the 2-methylbutene-2 in the redistribution process has not been determined since its exact identity is not of sufficient concern to warrant the time and expense in employing the highly sophisticated techniques necessary to determine its identity. It is believed that the redistribution reaction initially affects the breaking or cleavage of the double bond of the 2-methylbutene-2. The important aspect is not the identity of the material produced but rather is its boiling point which is sufficiently high that the material can be readily separated from the desired dimethylhydrogenchlorosilane by distillation.

The advantages of the present invention are readily apparent in that it is now possible to achieve the multiple objectives of converting 2-methylbutene-2 to a material which can be readily separated from the dimethylhydrogen chlorosilane by conventional distillation, and of redistributing various organochlorosilanes to the dimethylhydrogenchlorosilane and dimethyldichlorosilane in a single step. The quantity of available dimethylhydrogenchlorosilane after the redistribution reaction is usually at least about 2 or 3 times the amount of dimethylhydrogenchlorosilane which was introduced into the redistribution reactor.

It is quite surprising that the heretofore employed hydrochlorination of the 2-methylbutene-2 is no longer necessary in obtaining purified dimethylhydrochlorosilane from admixtures containing the dimethylhydrogenchlorosilane and 2-methylbutene-2. Also it could not be predicted that the presence of the 2-methylbutene-2 in the redistribution reaction would not adversely affect the redistribution reaction.

The next essential step in the process of the present invention is a distillation step to separate the dimethylhydrogenchlorosilane from the dimethyldichlorosilane, the product obtained from the 2-methylbutene-2 and other impurities in order to recover a purified dimethylhydrogenchlorosilane which is of acceptable purity for use in further synthesis such as in preparing silicone polymers. This distillation is preferably carried out at a temperature of from about 100 to about 140° C. The pressure of this distillation is usually between about 15 and 25 p.s.i.g.

The invention will be more clearly understood from the following description read in conjunction with the figure which schematically illustrates a flow diagram for the purification of an impure dimethylhydrogenchlorosilane admixture.

In the figure, line 1 connects to a distillation column 2 which has a bottoms outlet line 3 and an overhead outlet line 4. Line 4 passes into a mixing vessel 5. Mixing vessel 5 is provided with additional inlets 6 and 7 and an outlet line 8. Outlet line 8 from mixing vessel 5 connects to a redistribution reactor 9 which has an outlet line 10. Outlet line 10 then connects to a distillation column 11 which is provided with an overhead outlet line 13 and a bottoms outlet line 12.

An impure dimethylhydrogenchlorosilane admixture is fed to a distillation column 2 via line 1. An impure dimethylhydrogenchlorosilane admixture containing 2-methylbutene-2 and silanes boiling up to about 41° C. is removed from the distillation column as the overhead through line 4 and is passed to mixing vessel 5. The silanes having boiling points above about 41° C. are removed from the distillation column as the bottoms through line 3. Methylhydrogendichlorosilane and trimethylchlorosilane are fed to mixing vessel 5 through lines 6 and 7, respectively. The impure dimethylhydrogenchlorosilane admixture is then passed from mixing vessel 5 through line 8 to redistribution reactor 9.

An admixture containing dimethylhydrogenchlorosilane in amounts greater than the amounts introduced into the redistribution reaction and being substantially free of 2-methylbutene-2 is removed from the redistribution reactor through line 10 and is then introduced into distillation column 11. A bottoms admixture is removed from distillation column through line 12 containing predominantly dimethyldichlorosilane and the product obtained from the reaction in the redistribution zone of the 2-methylbutene-2. The bottoms removed from the distillation column are then usually admixed with much larger quantities of substantially pure dimethyldichlorosilane obtained elsewhere. Therefore, the contamination of the dimethyldichlorosilane with the product from the 2-methylbutene-2 does not present any problem since its concentration will be greatly reduced after being added to the other substantially pure dimethyldichlorosilane. Accordingly, it is not necessary to further treat the dimethyldichlorosilane admixture which is obtained as the bottoms. A purified dimethylhydrogenchlorosilane product is removed from distillation tower 11 through line 13 as the overhead and is found to be substantially free of 2-methylbutene-2. The dimethylhydrogenchlorosilane at this stage has a purity at least about 97%, which is suitable for polymer formation.

In order that the invention may be better understood the following non-limiting example is given wherein all parts are by weight unless the contrary is set forth:

EXAMPLE 1

5000 parts of an impure dimethylhydrogenchlorosilane admixture obtained from the reaction between methyl chloride and copper-silicone are fed to a distillation column operated at 40° C. and at 15 pj.s.i.g. 4500 parts of a bottoms product is remoxed and 500 parts of dimethylhydrogendichlorosilane admixture containing about 100 parts of dimethylhydrogenchlorosilane, about 125 parts of 2-methylbutene-2, about 125 parts of tetramethylsilane, about 75 parts of trichlorohydrogensilane, and about 75 parts of methylhydrogendichlorosilane. This overhead product is fed to a mixing vessel which is equipped with a stirrer and into which is also added 300 parts of methylhydrogendichlorosilane and 700 parts of trimethylchlorosilane. After the materials in the mixing vessel are thoroughly mixed, the admixture is then fed to a redistribution reactor. The redistribution reactor is operated at about 120 to 125° C. and a pressure of 120 p.s.i.g. About 100 parts of AlCl₃ catalyst are present in the redistribution reactor. The redistribution reactor is provided with a stirring apparatus to provide adequate contact between the catalyst and admixture present therein. The temperature is maintained at about 120 to 125° C. in the redistribution reactor for 2 hours. The temperature of the redistribution reactor is then reduced to 45° C. and the pressure is reduced to about 20 p.s.i.g. The dimethylhydrogenchlorosilane admixture is then reheated in the redistribution reactor to a temperature of about 120° C. and is removed from the redistribution reactor as a gaseous stream. The dimethylhydrogenchlorosilane admixture is then fed to a distillation column which is operated at about 125° C. and at a pressure of 20 p.s.i.g. 1230 parts of a material containing 900 parts of dimethyldichlorosilane, with the remainder being other silanes, the product from the 2-methylbutene-2, and small amounts of other materials are removed from the distillation column as the bottoms products. 270 parts of dimethylhydrogenchlorosilane of 97% purity are recovered from the distillation column as the overhead product.

What is claimed is:
1. Process for purifying an impure dimethylhydrogenchlorosilane containing admixture which comprises:
    (a) providing an admixture containing dimethylhydrogenchlorosilane, and 2-methylbutene-2;
    (b) introducing said admixture into a redistribution zone;
    (c) subjecting said admixture to redistribution in said redistribution zone;
    (d) subjecting the admixture to distillation; and
    (e) recovering purified dimethylhydrogenchlorosilane.
2. The process of claim 1 wherein said admixture contains chlorosilanes having boiling points up to about 41° C.
3. The process of claim 2 wherein said admixture also contains trimethylchlorosilane.
4. The process of claim 1 wherein said redistribution is carried out at a temperature of about 110 to 140° C.
5. The process of claim 3 wherein said redistribution catalyst is AlCl₃.
6. The process of claim 1 wherein said distillation is carried out at a temperature of about 100 to about 140° C., and a pressure of about 15 to 25 p.s.i.g.
7. The process of claim 1 which further includes subjecting the impure dimethylhydrogenchlorosilane admixture to a distillation for separating silanes boiling above about 41° C. therefrom prior to said redistribution.
8. The process of claim 7 wherein said admixture prior to said redistribution but subsequent to said distillation for separating silanes boiling about about 41° C. contains about 10 to about 30% by weight of dimethylhydrogenchlorosilane, about 15 to about 35% by weight tetramethylsilane, about 10 to about 30% by weight trichlorohydrogensilane, up to about 20% by weight methylhydrogendichlorosilane and about 15 to about 35% by weight 2-methylbutene-2.
9. The process of claim 7 which further includes admixing the impure dimethylhydrogenchlorosilane admixture with methylhydrogendichlorosilane and trimethylchlorosilane subsequent to said distillation for separating silanes boiling above about 41° C. but prior to said redistribution.
10. The process of claim 9 wherein said admixture prior to said redistribution but subsequent to said admixing contains about 1 to about 10% by weight of dimethylhydrogenchlorosilane; about 7 to about 10% by weight of tetramethylsilane; less than about 6% by weight of trichlorohydrogensilane; about 25 to about 30% by weight of methylhydrogendichlorosilane; about 40 to about 50% by weight of trimethylchlorosilane, and about 6 to about 10% by weight of 2-methylbutene-2.
11. The process of claim 9 wherein said redistribution is carried out at a temperature of about 110 to 140° C.
12. The process of claim 9 wherein said redistribution catalyst is AlCl₃.

References Cited

UNITED STATES PATENTS

| | | | |
|---|---|---|---|
| 3,332,974 | 7/1967 | Bustick | 260—448.2 E |
| 3,359,186 | 12/1967 | Petelinkar | 260—448.2 EX |
| 3,428,530 | 2/1969 | Fauche et al. | 260—448.2 X |

JAMES E. POER, Primary Examiner

P. F. SHAVER, Assistant Examiner

U.S. Cl. X.R.

260—448.2 H, 448.2 P